United States Patent [19]

Lehari et al.

[11] 3,725,901

[45] Apr. 3, 1973

[54] METHOD OF AND APPARATUS FOR REPRESENTING MEASURED VALUES ON THE SCREEN OF A VIDEO APPARATUS

[75] Inventors: Eckmar Lehari; Manfred Schwarztrauber, both of Karlsruhe, Germany

[73] Assignee: Siemens Aktiengesellschaft, Munich, Germany

[22] Filed: Mar. 29, 1971

[21] Appl. No.: 128,743

[30] Foreign Application Priority Data

Mar. 28, 1970 Germany....................P 20 14 953.5

[52] U.S. Cl.................................340/324 A, 315/22

[51] Int. Cl.................................................G06f 3/14

[58] Field of Search....340/324 A, 324 AD, 15.5 DS, 340/15.5 VD; 235/197, 198; 315/22, 30

[56] References Cited

UNITED STATES PATENTS

| | | | |
|---|---|---|---|
| 3,406,387 | 10/1968 | Werme | 340/324 A |
| 3,603,963 | 9/1971 | Ward | 340/324 A |
| 3,585,440 | 6/1971 | Lee | 340/324 A |
| 3,382,436 | 5/1968 | Wu | 340/324 A |
| 3,648,270 | 3/1972 | Metz et al. | 340/324 AD |
| 3,474,438 | 10/1969 | Lauher | 340/324 A |
| 3,343,030 | 9/1967 | Dragon et al. | 340/324 A |

*Primary Examiner*—John W. Caldwell
*Assistant Examiner*—Marshall M. Curtis
*Attorney*—Edwin Greigg

[57] ABSTRACT

For the reproduction of measured values on the screen of a line scanning video apparatus, the intensity of the beam current thereof is modulated with unblanking signals to a mean value during the writing of each line between the image field edge and the unblanked image dots of the measured values. The beam current and consequently the intensity of the beam for the latter is greater than the said mean value. The frequency value of the unblanking signals is such that the bright-modulated image dots are no larger than the image elements.

13 Claims, 5 Drawing Figures

Inventors:
Eckmar Lehari &
Manfred Schwarzhauber
by: Edwin E. Greigg

METHOD OF AND APPARATUS FOR REPRESENTING MEASURED VALUES ON THE SCREEN OF A VIDEO APPARATUS

BACKGROUND OF THE INVENTION

This invention relates to a method of and an apparatus for representing measured values on the screen of a line scanning video apparatus. The measured values to be represented are compared with the position of a counter summing up the pulses supplied by a beat generator and, in case of an agreement, there is emitted an unblanking pulse, whereupon an image dot for a measured value (hereinafter designated as "value dot") is generated. The distance of the dot from the edge of the image field corresponds to the magnitude of the measured value. In each line there is plotted one such value dot. Since the latter are reproduced in a continuously repetitive manner, on the picture screen of the video apparatus there will be seen a measured value curve of the type conventionally obtainable by a recording apparatus.

As noted hereinabove, the distance of the image dots from the edge of the image field is a measure of their magnitude. It is to be noted that by the expression "edge of image field" it is meant not the edge of the picture screen but the edge of the field within which the measured values are represented. In general, this image field edge is constituted by an ordinate axis, preferably by the one which corresponds to zero value. In case of a zero-point suppression or a zero-point shift into the image field, the image field edge coincides with an ordinate representing another value. In such a case the distance between the value dot and the edge of the image field is a result of a time conversion regarding the measured value which is obtained by counting upwards, by means of a counter, beat pulses of constant frequency until the measured value is reached. The distance of a measured value from the image field edge is therefore variable only in discrete steps whereby the magnitude of the steps is determined by the best frequency. In case the beat frequency is large, the steps are small and conversely. In this manner the magnitude of the smallest image point representable on the screen and containing an information (the so-called image element) is also given. Its magnitude further determines the sharpness of the image. It is apparent that the best pulse frequency may determine the magnitude of the image element only up to a certain limit frequency. A further increase no longer improves the sharpness of the image since other factors, such as the focusing of the beam current, the band width, the properties of the luminescent layer of the picture tube, and the like, do not allow a further decrease in the magnitude of the image elements. A method of the aforeoutlined type for representing measured values is already known and is described in German Published Pat. application DAS 1,084,954.

By means of the aforeoutlined process the measured values are represented as individual image dots of constant dimension. In case of a steep course of the curves, the dots are spaced substantially from one another, so that if several curves intersect, the course thereof may be recognized only with difficulty. It is often important to clearly recognize a curve from a substantial distance. To ensure a curve reproduction which satisfies this requirement, the so-called histogram representation may be chosen, wherein the entire area between the measured value curve and the image field edge is modulated with unblanking signals (hereinafter also referred to as modulated bright). Thus, the histogram is formed of different image dots such as the image dots of measured values (the value dots) at one edge of the histogram and the image dots representing the area between the value dots and the image field edge. The image dots pertaining to the histogram area will be referred to hereinafter as "area dots." In a curve representation of this type the beam current of the video apparatus may be modulated with unblanking signals (i.e. modulated bright) after the representation of the image field edge and modulated with blanking signals (i.e. modulated dark) after the reproduction of the value dots. In case a plurality of curves are shown, the difficulty arises that, if they run through the histogram area, they may be no longer recognized. Theoretically, this might be circumvented by representing the histograms with a lesser brightness than the individual curves. The lesser light intensity, however, results in the disadvantage that particularly the edge which, since it contains the value dots, is of particular importance, can be recognized only with difficulty. Further, several histograms may be differentiated only if they are not represented with the maximum brightness and if the overlapping portions of the histograms area are shown brighter. If the histograms were represented with maximum brightness, at any time only the histogram with the greatest amplitude would be visible. In case of a representation of a sole histogram, the modulation of the video apparatus to the maximum brightness has the disadvantage that the life expectancy of the picture tube is substantially shortened.

OBJECT AND SUMMARY OF THE INVENTION

It is an object of the invention to provide a method and an apparatus which permit a simultaneous representation of several measured value series as individually clearly distinguishable histograms on the picture screen of a video apparatus.

Briefly stated, according to the invention, during the writing or display of lines between the image field edge and the unblanked value dots, the beam current of the video apparatus is modulated to a mean brightness which is less than that of the beam current used for the reproduction of the value dots.

The invention will be better understood, as well as further objects and advantages of the invention will become more apparent, from the ensuing detailed specification of several exemplary embodiments taken in conjunction with the drawing.

GENERAL CHARACTERISTICS OF THE METHOD ACCORDING TO THE INVENTION

Figure 1:
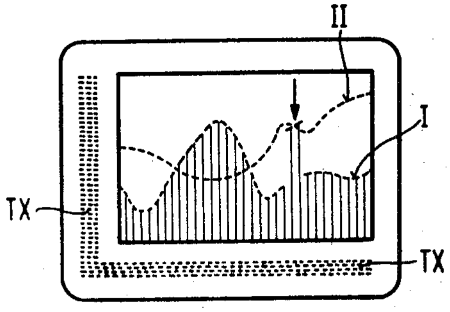
FIG. 1 is a view of a television picture screen illustrating the histogram representation according to the invention.

With the process according to the invention, value dots may be written with a maximum brightness, whereas the histogram areas may be shown with a lesser light intensity. This makes possible to recognize the value dots of a histogram, even if they are superposed by the area dots of another histogram. For an improved distinction between the histograms, the overlapping portions of the histogram areas may be shown with an increased brightness. Should, however, a third curve of value dots be written into such a brighter area, it will be distinguishable only with difficulty. Thus, in case a plurality of curves are to be reproduced simultaneously, it is advantageous to effect representation in color, whereby to each curve there may be assigned a predetermined color, resulting in a color mix in the overlapping areas.

By representing histograms with a method according to the invention, the picture tubes are operated with a lesser means brightness and therefore their life expectancy is increased.

A histogram, the area dots of which are darker than its value dots, may be generated by maintaining the signal level for the area dots lower than that for the value dots. Signal level differences of this type are, however, undesirable in the digital technique since there the so-called TTL-technique is utilized which requires a determined signal level. Besides, for the transmission of the different signal levels a plurality of light intensity modulating units are necessary which often are not available. Therefore, according to a further development of the invention, during the writing of the lines between the image field edge and the bright-modulated value dots, the beam current of the video apparatus is modulated by the area intensity modulating signals with a frequency of at least such a high value that the bright-modulated area dots will have the approximate magnitude of the smallest image element. In this manner the individual area dots have the same brightness as the value dots. Since the beat pulses release the scanning beam only periodically, for example, in the best ratio of 1:1, the mean brightness of the histogram area is smaller. Further, the image sharpness is not lost either, since the area dots have approximately the same magnitude as the image elements. This is certainly the case when the beam current is modulated with the frequency of the best pulses which are summed up in the counter.

Since during the representation of area dots on the one hand and of value dots on the other hand, the beam current is the same, one might think that an accentuation of the value dots is no longer possible. Such an accentuation may be achieved, however, by causing the brightness modulating signals for the value dots to last longer than the brightness modulating signals for the area dots. The value dots are therefore not dots but small dashes in the direction of the image lines. It was found that the measured value curves may be nevertheless sharply distinguished, particularly if the small dashes extend into the histogram area and the outer ends correspond to the measured values, since an observer interprets the border of the histograms as the measured value curve.

In case a shadow mask-type color television tube is used, it is advantageous to modulate the beam current with such a frequency that each light intensity signal for modulating the brightness of area dots excites only a single tricolor element. During continuous intensity modulation of a line, instead of a single tricolor element adjacent elements are also excited because of over-modulation. By means of color representation particularly contrast-rich histograms may be obtained, since areas of mixed color appear in the overlapping portions.

For a more rapid quantitative grasp of the curve values often coordinate lines are added to the image field. Normally — for example, during representation of simple curves — such coordinates are modulated bright. In case of histogram-representation, however, the difficulty arises that the coordinates do not distinctly stand out in the bright-modulated histogram areas, particularly if they are shown with less than the maximum brightness, so as not to distract the observer significantly from viewing the course of the curve. In order to ensure that the coordinate lines stand out more distinctly, they had to be shown with an increased brightness. Thus, according to a further development of the invention, the coordinate lines, when they are outside the histogram area, the bright-modulated in a normal manner, while the coordinate lines inside the histogram area are made distinct therefrom by being modulated with blanking signals.

DESCRIPTION OF THE EMBODIMENTS

Turning now to FIG. 1, there is schematically shown the picture screen of a video apparatus. In the image field of the picture screen there are reproduced two measured value curves I and II. The curve I is discontinuous at the location identified with an arrow. In case of simple representation, such interruption may be recognized only with difficulty and further, it renders the curve II ambiguous. If, as shown in FIG. 1, the curve I is shown as a histogram, then the two significantly differing dots may be distinctly recognized. Further, that portion of the curve II which passes through the histogram area of the curve I, distinctly stands out with respect to the histogram area if the image dots forming the curve are brighter than the image dots representing the histogram area. For the construction of the histogram the lines between the writing of the lower image field edge and the value dots of the curve I are modulated bright. Below and laterally of the image field provided for the representation of curves I and II, symbols or legends TX may be shown. In case both curves I and II are shown as histograms, then the two histogram areas overlap. In case of two histograms the recognizability is not in jeopardy. In case of more than two histograms, however, a representation in color is preferred.

Figure 2:
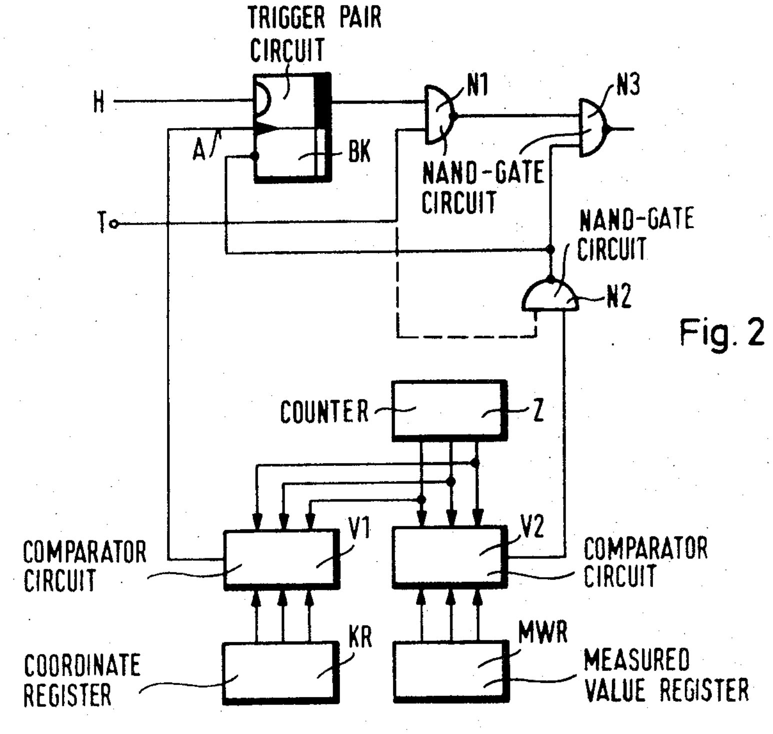
FIG. 2 is a circuit diagram for obtaining the histograms.

Turning now to FIG. 2 there is shown the diagram of a circuit by means of which control signals are generated which, in turn, are applied to a video apparatus for the representation of a histogram. To the input A of a trigger pair circuit BK there are applied pulses which are used for writing the image field edge extending normal to the direction of lines. These pulses are generated by presetting a coordinate register KR to a number which is identical to the number of the beat pulses which are summed up in a counter Z from the beginning of the writing of one line until the writing of the edge of the image field. In a comparator circuit V1 the agreement of the position of the counter Z with the contents of the coordinate register KR is determined, whereupon a switching signal is transmitted to the trigger pair circuit BK. The latter delivers, after setting, a release signal for a gate circuit, such as a NAND-gate N1 which is controlled with beat pulses (preferably with those which are summed up by the counter) which are allowed to pass through until the trigger pair circuit BK is reset. The resetting is triggered by a second comparator circuit V2 when the position of the counter Z is identical to the content of a measured value register MWR in which the measured value to be represented in each line is introduced from an image repeating memory. The output signal of the comparator circuit V2 serves for the representation of the value dots. In the circuit arrangement according to FIG. 2 the output pulses of the comparator circuit V2 are directed through a NAND-gate N2 and therefrom are applied to the resetting input of the trigger pair circuit BK, so that the latter, on command by such a pulse, closes the NAND-gate N1 for the beat pulses. The representation of a histogram by one line is thus terminated with the writing of a value dot.

Figure 3:
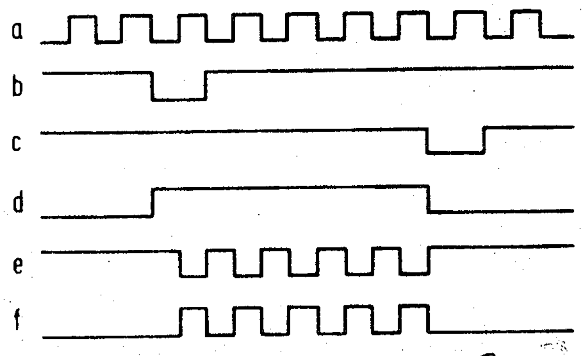
FIG. 3 illustrates the signal pulses obtained by the circuit illustrated in FIG. 2.

The signals for modulating the brightness of the area dots generated in the NAND-gate N1 and the signals for modulating the brightness of the value dots appearing at the output of the NAND-gate N2 are linked to one another in a third NAND-gate N3. This linking together is effected in such a manner that the last pulse of a line lasts longer than the unblanking pulses for the area dots in the representation of the histogram area. This occurrence is illustrated in FIG. 3. At the beginning of the writing of one line the trigger pair circuit BK is in such a condition that the NAND-gate N1 is closed for the beat pulses, the course of which is illustrated by the diagram *a*. If the counter Z reaches the number preset in the coordinate register KR, the comparator circuit V1 transmits, for the duration of a beat pulse period, a signal according to diagram *b*. The trigger pair circuit BK transmits a release signal *d* to the NAND-gate N1, the output pulses of which, that serve as unblanking signals for the area dots, pass through the NAND-gate N3 and appear at the output of the circuit. The output pulses are represented by the diagram *f*. When the content of the counter reaches the value preset in the measured value register MWR, the comparator circuit V2 transmits a pulse which is negated in the gate N2 and, as a result, has the configuration illustrated by diagram *c*. With the start of this pulse the trigger pair circuit BK is reset and the NAND-gate N1 is closed. The twice as long output signal of the comparator circuit V2, however, is linked through the NAND-gate N3 directly to the last unblanking pulse for the histogram area at the output of the NAND-gate N3. Consequently, the duration of the last pulse is three times as long as an unblanking pulse for an area dot without exceeding thereby the amplitude value to be indicated. In this manner the brightness of the histogram edge is substantially increased so that the measured value curve stands out in a distinct manner. In case a spread of the measured value curve is not desired, such occurrence may be prevented by applying to a second input of the NAND-gate N2 the beat pulses by means of a conductor shown in broken lines. If, in addition, the output signal of the gate N1 is negated, or instead of the NAND-gate N1 an AND-gate is used, the value dots have twice the width of the area dots.

Figure 4:
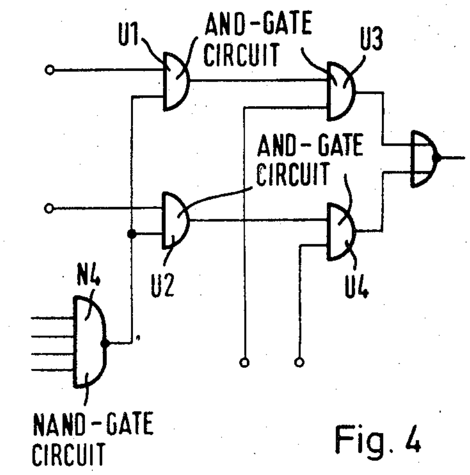
FIGS. 4 and 5 are circuit diagrams for obtaining coordinate lines in histograms.

As already set forth hereinbefore, the coordinate lines are advantageously modulated dark in the histogram area and modulated bright externally thereof. A circuit for such a modulation of the beam current is illustrated in FIG. 4 and is effected by combining the histogram pulses — that correspond to the output pulses of the trigger pair circuit BK of FIG. 2 — in a NAND-gate N4 or a similarly operating circuit which opens two gate circuits U1 and U2 when a histogram signal is applied to the NAND-gate N4. To the other inputs of the gates U1 and U2 there are applied the pulses corresponding to the ordinate and abscissa scale lines. To the coincidence gates U1 and U2 there are connected further coincidence gates U3 and U4, to the other inputs of which there are applied pulses whose length determines the image field range in which the coordinates are to be shown. If a signal appears at an output of the two AND-gates U3 and U4, the image is modulated with a blanking signal, so that the coordinates will appear in the histogram area in dark lines.

Figure 5:
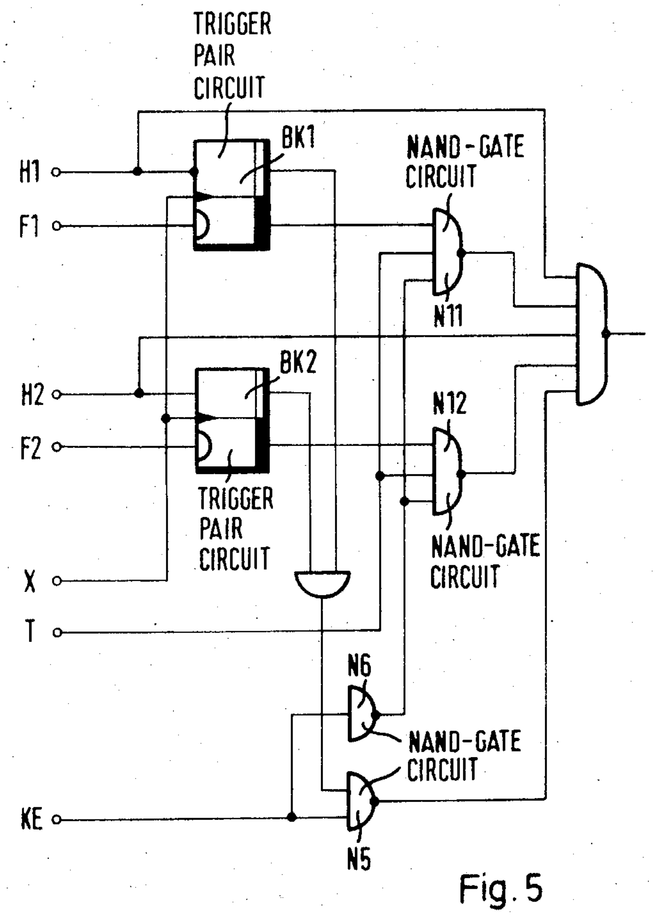

Turning now to FIG. 5 there is shown another type of circuit for the dark modulation of the coordinate lines within the histogram areas. There are provided two trigger pair circuits BK1 and BK2 which have the same function as the trigger pair circuit BK shown in the circuit according to FIG. 2. With the aid of the circuit illustrated in FIG. 5, two different histograms may be represented on the picture screen. The unblanking signals for the value dots are applied to the inputs H1 and H2, the release signals for the trigger circuit pairs are applied to the inputs F1 and F2, the pulses transmitted during the reproduction of the image field edge are applied to the input X, the beat pulses are applied to the input T and the unblanking signals for the coordinates are applied to the input KE. If none of the trigger pair circuits BK1 or BK2 is set, the NAND-gates N11 and N12, which correspond to the NAND-gate N1 in the circuit according to FIG. 2, are blocked and the NAND-gate N5 is opened so that the coordinate pulses are applied to the video apparatus an unblanking pulses. If, on the contrary, one of the trigger pair circuits BK1 or BK2 is switched, the NAND-gate N5 is blocked for the coordinate pulses. Simultaneously, however, the gate N11 or N12 is opened for the beat pulses as long as no coordinate pulses are applied. These are negated in the negation gate N6 and close the NAND-gates N11 and N12 so that upon appearance of a coordinate pulse, there appears a gap in the unblanking signals for the area dots and thus the coordinates appear as dark lines in the histogram area.

That which is claimed is:

1. A method of representing measured values on the screen of a beam intensity modulated line scanning video apparatus comprising: comparing signals corresponding to the measured values to be represented with the position of value of beat pulses summed in a counter, generating a first pulse unblanking signal upon coincidence of the signals corresponding to the measured values and the positional value of said beat pulses, generating a second unblanking signal in the form of a train of pulses the individual pulses widths of which are less than that of said first pulse, modulating the intensity of the beam current with said first pulse unblanking signal to thereby produce a value dot having a given brightness over its dimension in the scanning direction on the screen at a position such that the distance of said value dot from the edge of the image field within which measured values are produced corresponds to the magnitude of a measured value, and modulating, with said second unblanking signal, the intensity of the beam current of the video apparatus during the writing of each line between the edge of the image field and the value dots to a mean intensity which is less than the intensity of the beam current used for producing said value dots of said given brightness, the resulting mean brightness of each line length between the edge of the image field and the value dots being less than said given brightness.

2. A method as defined in claim 1 wherein the intensity of the beam current of the video apparatus is modulated during the writing of each line between the edge of the image field and the value dots with said second unblanking signal having a frequency such that image dots are formed between the edge of the image field and the value dots, the brightness of each image dot being equal at most to that of the smallest image element.

3. A method as defined in claim 1, wherein the beam current is modulated by said second unblanking signal at the frequency of said beat pulses.

4. A method as defined in claim 2 including the step of joining respectively said first unblanking signal for each of the value dots to that part of said second unblanking signal for that image dot which is the last in each respective line.

5. A method as defined in claim 2, wherein said video apparatus includes a shadow mask-type color television picture tube and wherein the beam current is modulated with a frequency such that at any time only a sole dot triad of the picture tube is excited.

6. A method as defined in claim 1, including the steps of modulating the beam current with a third unblanking signal to represent coordinate lines on the screen when said first and said second unblanking signals are absent and modulating the beam current with a blanking signal when either of said first and said second unblanking signals is simultaneously present for the production of dots.

7. A circuit for modulating the beam intensity of a beam intensity modulated line scanning video apparatus adapted to visually display measured values on the screen of the video apparatus in the form of a histogram composed of value dots and area dots wherein said area dots are formed between the value dots and the edge of the image field within which measured values are presented and the distance from a value dot to the edge of the image field corresponds to the magnitude of a measured value comprising: a trigger pair having a first, a second and a third input and an output, means for applying a first signal to said first input for setting said trigger, means for applying a second signal to said second input for generating a release signal at the output of said trigger pair, means for producing a first unblanking signal corresponding to a value dot, means for applying a third signal to said third input for resetting said trigger in accordance with the writing of any said value dot on the screen and gate means having a first input connected to the output of said trigger pair, a second input connected to receive a second unblanking signal in the form of beat pulses and a third input connected to receive said first unblanking signal, and output means for delivering composite unblanking signals for modulating the beam intensity whereby the writing of area dots and value dots is controlled.

8. A circuit as set forth in claim 7 wherein said gate means comprises a first gate having a first input means connected to receive the output of said trigger pair and a second input means for receiving said second unblanking signal, the duration of said first unblanking signal being twice the duration of the pulses which form said second unblanking signal for area dots.

9. A circuit as set forth in claim 8 further including a beat pulse counter and a comparator circuit for comparing the digital value of the measured values with the output of said counter and means for developing said first unblanking signal for the representation of the value dots and means for applying said first unblanking signal to said third input of said triggered pair.

10. A circuit as set forth in claim 9 wherein said gate means comprises a second gate and a third gate, said second gate having a first input connected to receive said first unblanking signal and an output connected to the first input of said third gate, a second input of said third gate being connected to the output of said first gate.

11. A circuit as set forth in claim 10 wherein said second gate includes a second input connected to receive beat pulses.

12. A circuit as set forth in claim 10 wherein said gate means and said first, said second and said third gates are NAND circuits.

13. A method of representing measured values on the screen of a beam intensity modulated line scanning video apparatus comprising: comparing signals corresponding to the measured values to be represented with the position of value of beat pulses summed in a counter, generating a first unblanking signal in the form of a pulse upon the coincidence of the signals corresponding to the measured values and the proportional value of said beat pulses, generating a second unblanking signal, modulating the intensity of the beam current with said first unblanking signal to thereby produce a value dot having a given brightness over its dimension in the scanning direction on the screen at a position such that the distance of said value dot from the edge of the image field within which measure values are produced corresponds to the magnitude of a measured value, and modulating, with said second unblanking signal, the intensity of the beam current of the video apparatus during the writing of each line between the edge of the image field and the value dots to a mean intensity which is less than the intensity of the beam current used for producing said value dots of given brightness, the resulting means brightness of each line between the edge of the image field and the value dots being less than said given brightness.

* * * * *